US009043501B2

(12) United States Patent
Ben Yehuda et al.

(10) Patent No.: US 9,043,501 B2
(45) Date of Patent: May 26, 2015

(54) INPUT/OUTPUT MONITORING MECHANISM

(71) Applicant: International Business Machines Corporation, Armonk, NY (US)

(72) Inventors: Shmuel Ben Yehuda, Haifa (IL); Michael E Factor, Haifa (IL); Abel Gordon, Haifa (IL); Nadav Yosef Har'el, Manof (IL); Razya Ladelsky, Haifa (IL); Eran Raichstein, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/950,304

(22) Filed: Jul. 25, 2013

(65) Prior Publication Data

US 2015/0032910 A1    Jan. 29, 2015

(51) Int. Cl.

| G06F 3/00 | (2006.01) |
|---|---|
| G06F 13/12 | (2006.01) |
| G06F 13/38 | (2006.01) |
| G06F 11/30 | (2006.01) |
| G06F 9/455 | (2006.01) |
| G06F 13/42 | (2006.01) |
| G06F 21/85 | (2013.01) |

(52) U.S. Cl.
CPC ............ *G06F 11/3041* (2013.01); *G06F 9/455* (2013.01); *G06F 13/4221* (2013.01); *G06F 9/45558* (2013.01); *G06F 21/85* (2013.01)

(58) Field of Classification Search
CPC ............ H04L 43/0817; H04L 12/2602; G06F 13/385; G06F 9/4411
USPC .................................................. 710/8, 62, 15
See application file for complete search history.

(56) References Cited

U.S. PATENT DOCUMENTS

| 2003/0079075 A1 | 4/2003 | Asseline |
| 2009/0089464 A1 | 4/2009 | Lach et al. |
| 2009/0133028 A1 | 5/2009 | Brown et al. |
| 2009/0276773 A1* | 11/2009 | Brown et al. ................. 718/1 |
| 2010/0146170 A1* | 6/2010 | Brown et al. ............... 710/105 |

(Continued)

OTHER PUBLICATIONS

Tu et al., "Secure I/O Device Sharing among Virtual Machines on Multiple Hosts", ISCA '13 Proceedings of the 40th Annual International Symposium on Computer Architecture, pp. 108-119.

(Continued)

*Primary Examiner* — Farley Abad

(57) ABSTRACT

Machines, systems and methods for I/O monitoring in a plurality of compute nodes and a plurality of service nodes utilizing a Peripheral Component Interconnect express (PCIe) are provided. In one embodiment, the method comprises assigning at least one virtual function to a services node and a plurality of compute nodes by the PCIe interconnect and a multi-root I/O virtualization (MR-IOV) adapter. The MR-IOV adapter enables bridging of a plurality of compute node virtual functions with corresponding services node virtual functions. A front-end driver on the compute node requests the services node virtual function to send data and the data is transferred to the services node virtual function by the MR-IOV adapter. A back-end driver running in the services node receives and passes the data to a software service to modify/monitor the data. The back-end driver sends the data to another virtual function or an external entity.

14 Claims, 6 Drawing Sheets

(56) References Cited

U.S. PATENT DOCUMENTS

2010/0312943 A1    12/2010    Uehara et al.
2012/0166690 A1    6/2012    Regula

OTHER PUBLICATIONS

International Search Report and Written Opinion for PCT/EP2014/064629; Mailed Aug. 25, 2014.

* cited by examiner

INPUT/OUTPUT MONITORING MECHANISM

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to input/output (I/O) monitoring and, more particularly, to a system and method for I/O monitoring to monitor data being communication between a source and a destination in a data communications network.

BACKGROUND

Software services (e.g., antivirus, firewall, intrusion detection, storage caching, compression, deduplication, encryption, etc.) rely on I/O interception or forwarding to monitor or modify the data communication between a source and a destination in a communications network. Several techniques are commonly used to monitor or intercept I/O traffic. One technique relies on the operating system (OS) kernel and requires installing new drivers or kernel modules or modifying existing ones for different OS. A software service may remain visible and vulnerable to attacks if the software service runs under the same OS used to run the applications. This particular limitation may be a problem for security software such as an antivirus or a firewall because it may be neutralized by some malicious application. In addition, the software needs to be installed and managed individually for every OS instance including virtual machines (VMs) or physical servers.

Another technique relies on the I/O virtualization framework at the OS or hypervisor level. Using this model, the software service may leverage the virtualization layer to intercept the I/O traffic agnostically to the OS and protect the software service from external attacks. Unfortunately, this model may be used only by hypervisor vendors unless the developer of the software signs an agreement with the hypervisor vendor to get access to internal and closed application programming interfaces (APIs), which usually limit the software service capabilities. In addition, the software service may require a different implementation for each hypervisor vendor. This is not compatible with the best performing I/O virtualization models and requires the usage of para-virtual drivers or emulation techniques to intercept the I/O traffic at the hypervisor level. Finally, using this model, the software service runs in each hypervisor and consumes processor, memory and I/O resources of each server.

One other technique requires directly connecting a physical or virtual appliance to the wire over which data is communication (e.g., Cisco Catalyst 6500, IBM Real-time compression appliance) and may force changes in the network topology to route all the traffic to the appliance before the data is delivered to the destination. This model may complicate the network configuration, network management and may degrade performance if the appliance has limited throughput and thus becomes a bottleneck hazard. Also, an appliance requires periodic maintenance, repairs and upgrades. To simplify the deployment, management and configuration, some vendors also offer services integrated into expensive physical appliances (e.g., switches) or rely on address take-over capability, if it is supported by the underlying protocol.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, Machines, systems and methods for I/O data monitoring and forwarding from a plurality of compute nodes to a plurality of service nodes utilizing a Peripheral Component Interconnect express (PCIe) are provided. In one embodiment, the method comprises assigning at least one virtual function to a services node and a plurality of compute nodes by the PCIe interconnect and a multi-root I/O virtualization (MR-IOV) adapter. The MR-IOV adapter enables bridging of a plurality of compute node virtual functions with corresponding services node virtual functions. A front-end driver on the compute node requests the services node virtual function to send data and the data is transferred to the services node virtual function by the MR-IOV adapter. A back-end driver running in the services node receives and passes the data to a software service to modify/monitor the data. The back-end driver sends the data to another virtual function or an external entity.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one embodiment, a method for I/O monitoring utilizing a Peripheral Component Interconnect express (PCIe) is proposed. PCIe is a part of the PCI Local Bus standard, which is a local computer bus for attaching hardware devices in a computer. The PCI bus supports the functions found on a processor bus in a standardized format that is independent of any particular processor. Devices connected to the bus appear to the processor to be connected directly to the processor bus, and are assigned addresses in the processor's address space. PCIe is the standard local interconnect protocol used in modern servers to enable I/O devices to communicate with the central processing unit (CPU) and random access memory (RAM) and provides an interface between the different types of interconnects, such as Fiber Channel, Ethernet and Infiniband.

As provided in further detail below, I/O data may be routed through a services node connected to a plurality of compute nodes over a switch. The switch may be implemented by way of a multi-root I/O virtualization (MR-IOV) adapter. MR-IOV adapter may act as a physical device that is shared among the plurality of compute nodes over a PCIe interconnect. In one implementation, the PCI-SIG Multi-Root I/O Virtualization and Sharing specifications (MR-IOV) may be supported to enable a PCIe adapter to be shared across a plurality of compute nodes (e.g., blades). MR-IOV adapters may be utilized to provide dedicated PCIe virtual-functions (e.g., sub-adapters) to each compute node and the compute nodes may access the PCIe virtual functions to communicate with the adapters.

Figure 1:
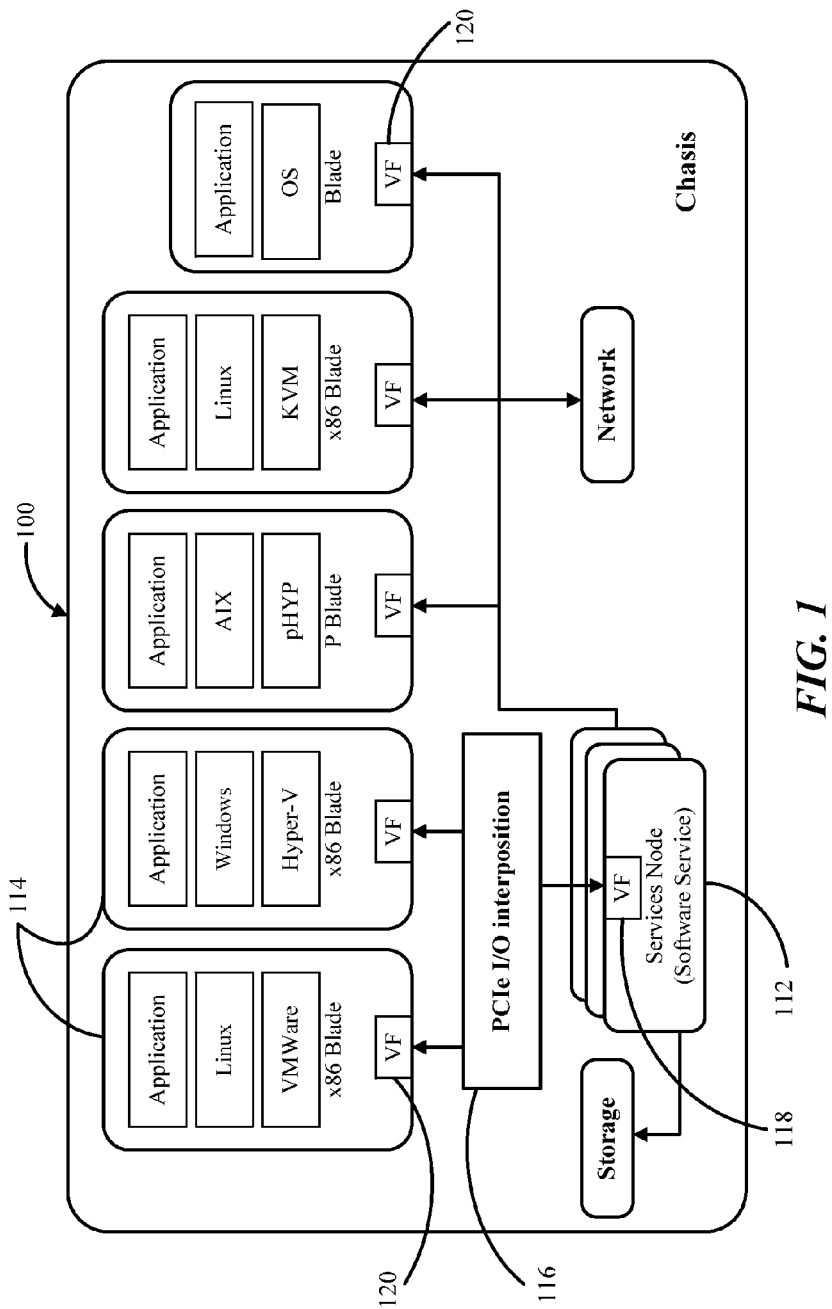
FIG. 1 illustrates an exemplary block diagram of an I/O monitoring system in accordance with one or more embodiments, wherein I/O traffic is routed through a services node connected to a plurality of compute nodes connected in a network.

Referring to FIG. 1, an exemplary block diagram of an I/O monitoring system 100 in accordance with one or more embodiments is illustrated, wherein I/O traffic is routed through a services node 112 connected to a plurality of compute nodes 114 via a PCIe interconnect 116. System 100 shown in FIG. 1 may be a blade enclosure in which the plurality of compute nodes 114 may serve as server blades. A server blade is a self-contained computer server designed for high density systems. Server blades have many components removed for space, power and other considerations while still having the functional components to be considered a computer. Blade enclosure provides services, such as power, cooling, networking, various interconnects, and management of various blades in blade enclosure. Blades and the blade enclosure together form a blade system.

In accordance with one aspect, one or more compute nodes (i.e., server blades) 114 may be connected to the services node 112 over a switch. The switch is implemented by way of a MR-IOV adapter which acts as a physical device that is shared among the plurality of compute nodes 114 over the PCIe interconnect 116. Upon initialization of the services node 112, a plurality of virtual functions 118 may be assigned to the services node 112, for the plurality of compute nodes 114 (connected to the PCIe interconnect 116) that are to be serviced by the services node 112. In addition, a virtual function 120 may be optionally assigned to one or more of the compute nodes 114. As such, more than one virtual function 120 may be assigned to the same compute node 114, depending on implementation.

The virtual function 120 at compute nodes 114 provides a communications end point that may be controlled by a software application running on the compute node 114. In other words, a software application with I/O capabilities running on a compute node 114 reads and writes the I/O directly to the virtual function 120 assigned to the compute node 114 on which the software is running. The virtual function 120 acts like a PCIe hardware adapter that the compute node 114 interfaces with in the PCIe bus. In one implementation, MR-IOV PCIe virtual functions 120 may be assigned to the plurality of compute nodes 114 and the MR-IOV adapter may be configured to route (or forward a duplicate copy of) the virtual function 120 traffic to a second PCIe virtual function 118 assigned to a dedicated services node 112. The services node 112 may process the data received by the virtual function (PCIe adapter) 118 that was originally sent by the virtual function 120, apply the software function (e.g. firewall, encryption, intrusion detection) and transmit the data to the destination (e.g. storage controller or network).

The MR-IOV adapter enables sharing a PCIe adapter across the plurality of compute nodes (blades) 114. MR-IOV adapters present dedicated PCIe virtual-functions (sub-adapters) 120 to one or more of the plurality of compute nodes 114 and the plurality of compute nodes 114 access the PCIe virtual functions 120 to communicate with the MR-IOV adapter. The services node 112 may use hardware accelerators (e.g., cryptographic co-processors) that are connected via PCIe interconnect 116 to improve the performance of the software services (e.g., a storage encryption service). The hardware accelerator may also be implemented as part of the MR-IOV adapter that also acts as the virtual function-to-virtual function switch. In addition, the software service may share local resources across the plurality of compute nodes 114. For example, in the case of a storage area network (SAN) cache service, the software may use volatile memory (e.g., RAM) or non-volatile memory (e.g., a solid state devices (SSD)) physically located in the services node 112 to cache data being read or written by the plurality of compute nodes 114. In contrast to running the software service in each of the plurality of compute nodes 114, the software services may use CPU and memory resources from the dedicated services node 112, leaving more resources available for the plurality of compute nodes 114 to run workloads or improve performance by way of implementing high throughput and low latency.

The MR-IOV adapter may be emulated using software in the services node 112. From the perspective of the plurality of compute nodes 114, the MR-IOV adapter emulated by software may appear as a physical device in the PCIe interconnect bus 116. A hypervisor or operating system (OS) running on the plurality of compute nodes 114, configured to interact with a standard PCIe device, may seamlessly interact with the MR-IOV adapter emulated by software. It is noteworthy that, in the above scenario, the data is desirably intercepted by the services node 112 and be processed by the corresponding software service. As such, a software service implementation is provided to support any hypervisor (e.g., VMware, Hyper-V, KVM) or bare-metal operating system (e.g. Linux, Windows), with an architecture (e.g., x86, P) implemented to run over hardware.

The above implementation may be utilized to prevent malicious attacks and also to deduplicate, compress or monitor data I/O path and apply a service to the I/O. PCIe interconnect protocol allows the CPU to configure and communicate with a device connected to the PCIe interconnect bus 116. The PCIe interconnect 116 allows a pair of compute nodes 114 to communicate with each other via the PCIe interconnect 116, optionally, using a single communication hub (e.g., network card, field programmable gate array (FPGA) card). The MR-IOV adapter may allow a single card to be shared across the plurality of compute nodes 114, as if each compute node has its own card. The card may have multiple virtual functions 120, instead of having a single physical function, and may thus share the virtual functions 120 among the plurality of compute nodes 114. The services node 112 may configure the virtual functions 120 among the plurality of compute nodes 114 and make sure that the I/O is first delivered to the virtual functions 118 owned by the services node 112. The virtual functions 120 are configured so that from the perspective of the plurality of compute nodes 114, there is no change in the routing of the data.

Figure 2:
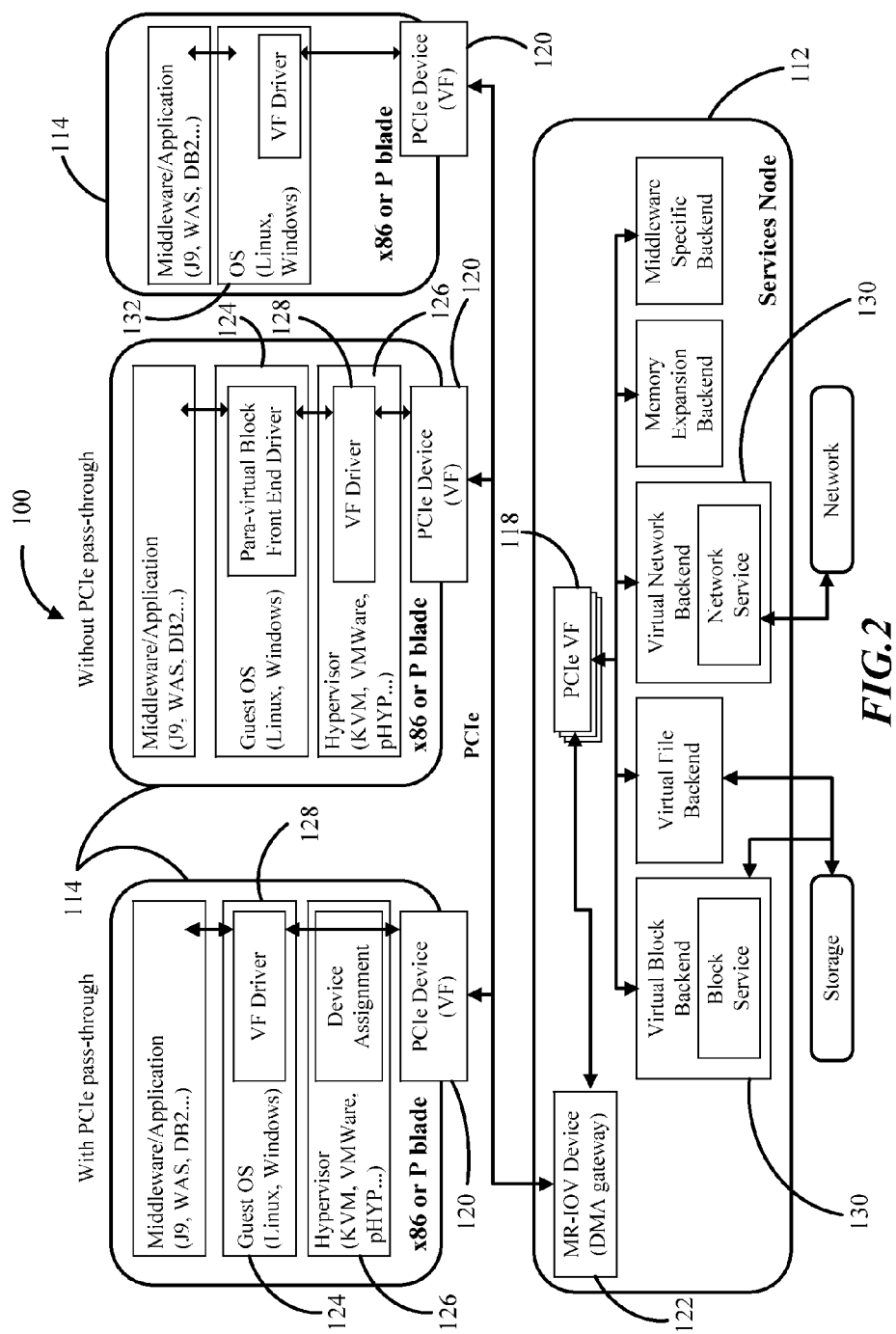
FIG. 2 is an exemplary block diagram of the I/O monitoring system, in accordance with one embodiment illustrating the I/O traffic through the system.

Referring to FIG. 2, an exemplary block diagram of the I/O monitoring system 100 is shown, in accordance with one embodiment illustrating the I/O traffic through the I/O monitoring system 100. As shown, the I/O traffic may be routed through the services node 112 connected to the plurality of compute nodes 114 connected via the PCIe interconnect 116. The PCIe interconnect 116 and the MR-IOV adapter 122 may be configured to assign one or more virtual functions 118 to the services node 112 when initialized. The PCIe interconnect 116 and the MR-IOV adapter 122 may be also configured to assign at least one virtual function 120 to one or more of the compute nodes 114 that are enabled with the software services. An OS 124 running in a virtual machine hosted by a hypervisor 126 on at least one of the plurality of compute nodes 114 accesses the virtual function 120 assigned to the compute node 114 (PCI pass-through) or the hypervisor 126 control the virtual function 120 directly and without passing it to the OS 124 running in the virtual machine (without PCI pass-through) or a bare-metal OS 132 running without a hypervisor accesses the virtual function 120 assigned to the compute node 114.

Upon initialization (i.e., when the I/O monitoring system 100 is booted), the OS 124 or the hypervisor 126 or a bare-metal OS 132 running on the plurality of compute nodes 114 loads the driver corresponding to the virtual function 120 as it does for any PCIe device. For the virtual functions 120 assigned to a compute node 114, there may be implemented a front-end driver 128 responsible for presenting the virtual function 120 as one or more adapters (e.g., a network adapter, a host bus adapter, etc.) to the hypervisor 126 or the OS 124 or the bare-metal OS 132. The front-end driver 128 may keep the data unchanged or encapsulate the data to append additional information. The front-end driver 128 may also implement the application programming interfaces (APIs) that are to be hosted by the OS 124 or hypervisor 126 running in the compute node 114.

The OS 124 or the hypervisor 126 uses the MR-IOV adapter 122 to communicate with the virtual functions 120 as a PCIe device. For a virtual function 118 assigned to the services node 112, there may be a back-end driver 130 responsible for communicating data with the virtual functions 120 assigned to the plurality of compute nodes 114. The back-end driver 130, optionally, implements the APIs that are to be hosted by the services node 112, for example. In addition, the back-end driver 130 may provide an API to allow a software service running in the services node 112 to monitor or communicate with the virtual functions 120 assigned to one or more compute nodes 114. The services node 112 may also use a management driver to configure the MR-IOV adapter 122 bridge capabilities and create the virtual functions 118, 120.

Once a service is enabled for a compute node 114, the MR-IOV adapter 122 may be configured to bridge the virtual function 120 assigned to the compute node 114 with a virtual function 118 assigned to the services node 112. The traffic sent by a compute node virtual function 120 may be redirected to a services node virtual function 118, without any changes in the protocol data encapsulated by the PCIe interconnect 116 (e.g., Fiber Channel, Ethernet, SCSI, InfiniBand). The MR-IOV adapter 122 may be optionally used as a direct memory access (DMA) gateway to communicate with the compute node RAM or the services node RAM.

Various types of memory structures (e.g., ring buffers, linked buffers) may be used to communicate with the MR-IOV adapter 122 in the compute node 114 as reflected in the services node 112. Data may remain within the adapter 122, the compute node RAM and the services node RAM. Alternatively, a type of MR-IOV adapter 122 may be designed (e.g., in form of an ASIC/FGPA) for virtual function-to-virtual function communication. In one implementation, the adapter 122 may not support external ports and may be protocol-agnostic. That is, adapter 122 may be configured to transfer content of memory buffers from one virtual function 120 to another virtual function 120 based on settings that are determined by a PCIe physical function controlled by the services node 112 or a management node.

The MR-IOV adapter 122 may be deployed in multiple models. In a first exemplary model, the hypervisor 126 may use Peripheral Component Interconnect (PCI) pass-through. In this example, the virtual function 120 is assigned directly to the OS 124 running in a given virtual machine hosted by the hypervisor 126 on at least one of the plurality of compute nodes 114. A compute node 114 may have more than one virtual function 120, thus it may assign many virtual functions 120 to multiple virtual machines running on the same compute node 114. In this case, a front-end driver 128 in the virtual machine OS 124 interacts directly with the device and bypasses the hypervisor 126. The application running on the virtual machine may interact with the adapter 122 using the virtual machine OS services (e.g., syscalls). The virtual machine OS 124 may not be bypassed, but the service may still be running outside the virtual machine OS 124 in the services node 112.

In a second exemplary model without using PCI pass-through, the hypervisor 126 may use emulated or para-virtualize I/O devices. The virtual function 120 may not be assigned to the virtual machine OS 124. The hypervisor 126 may own and control the virtual function 120 using the front-end driver 128. In this case, the hypervisor 126 may not be bypassed, but the service may be still running outside the hypervisor 126 in the services node 112. The above two models may be deployed simultaneously in the same compute node 114, assuming there are many virtual functions in the node.

In a third exemplary model, the compute node 114 may be a non-virtualized node running a bare-metal OS 132 and without a hypervisor 126. In this case, there may be a front-end driver 128 with a bare-metal OS 132 that interacts directly with the virtual function 120 (PCIe device). The application running on the bare-metal OS 132 interacts with the MR-IOV adapter 122 using the bare-metal OS services (e.g., syscalls). The bare-metal OS 132 may not be bypassed, but the service may still run outside the bare-metal OS 132 in the services node 112.

In accordance with one embodiment, the front-end driver 128 in the compute node 114 may request the virtual function 118 assigned to the services node 112 to send the data. The MR-IOV adapter 122 may transfer the data to the virtual function 118 assigned to the services node 112. The back-end driver 130 may intercept and pass the data to the software services running in the services node 112. The software services may modify or monitor the data and request that the back-end driver 130 to send the data to the final destination (e.g., other virtual function or an external entity such a network or storage controller). The back-end driver 130 in the services node 112 may receive the data to be sent to a compute node 114. In one implementation, the back-end driver 130 passes the data to the software services, which modify or monitor the data and ask the back-end driver 130 to send the data to the corresponding compute node 114 (virtual function). Depending on the type of service and the data content, the services node 112 may communicate with the compute node virtual functions 120, or the compute node virtual functions 120 and some external entity (e.g. Ethernet switch or storage controller). To communicate with external entities, the services node 112 may use additional adapters (e.g. NIC, HBA).

Figure 3A:
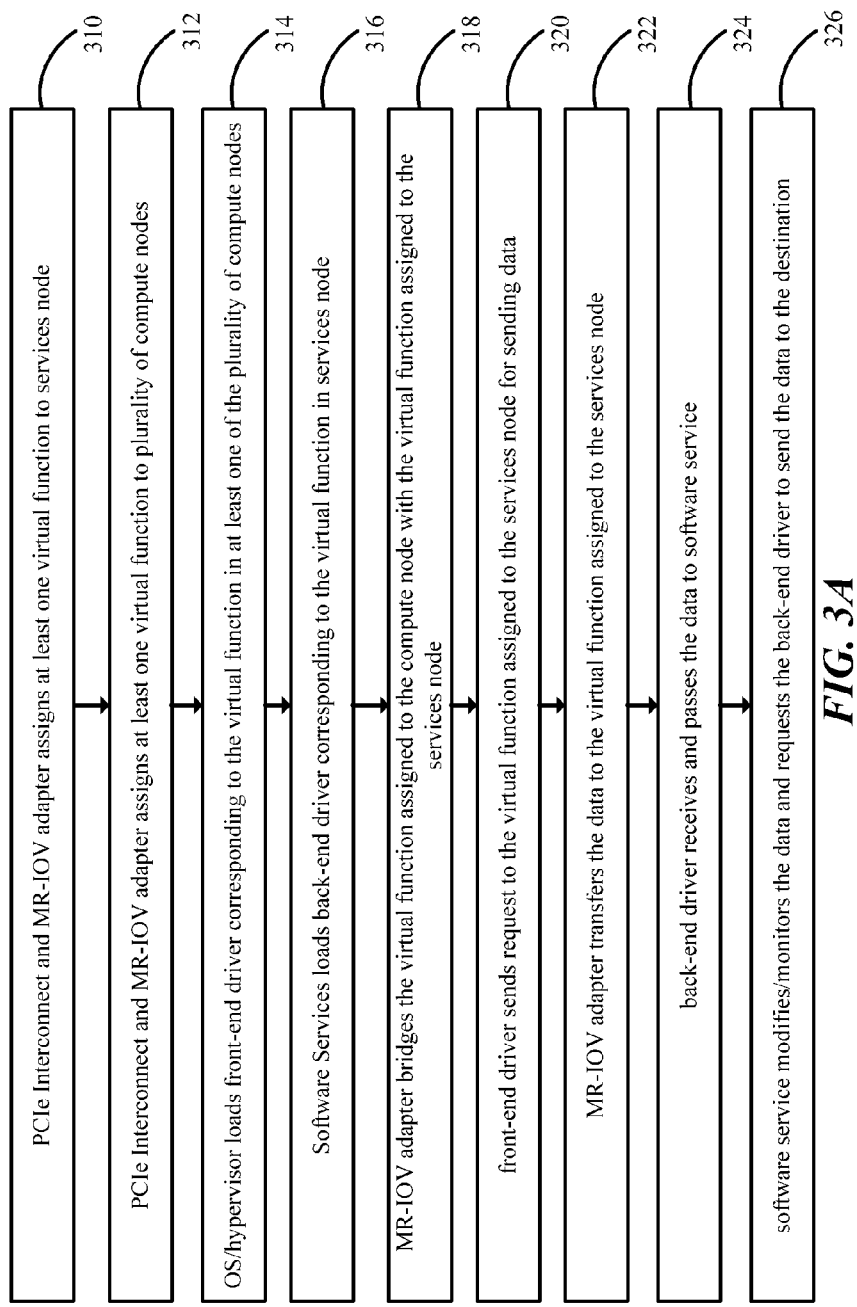
FIGS. 3A and 3B are flow diagrams of an exemplary method for I/O monitoring illustrating the I/O send path and receive path respectively, in accordance with one embodiment.

Referring to FIG. 3A, the PCIe interconnect 116 and the MR-IOV adapter 122 may assign at least one virtual function 118 to the services node 112 during initialization (P310). The PCIe interconnect 116 and the MR-IOV adapter 122 may also assign at least one virtual function 120 to the plurality of compute nodes 114 (P312). The OS 124 or hypervisor 126 running on at least one of the plurality of compute nodes may load the front-end driver 128 corresponding to the virtual function 120 in the compute node 114 (P314). The software services running on the services node 112 may load the back-end driver 130 corresponding to the virtual function 118 in services node 112 (P316). The MR-IOV adapter 122 bridges the virtual function 120 assigned to the compute node 114 with the virtual function 118 assigned to the services node 112 (P318). The front-end driver 128 may submit a request to the virtual function 118 assigned to the services node 112 for sending data (P320). The MR-IOV adapter 122 may transfer the data to the virtual function 118 assigned to the services node 112 (P322). The back-end driver 130 may receive the data and passes the data to the software service in the services node 112 (P324). The software service may update the data and request the back-end driver 130 to send the data to its destination (P326). The destination may be another virtual function or an external entity.

Figure 3B:
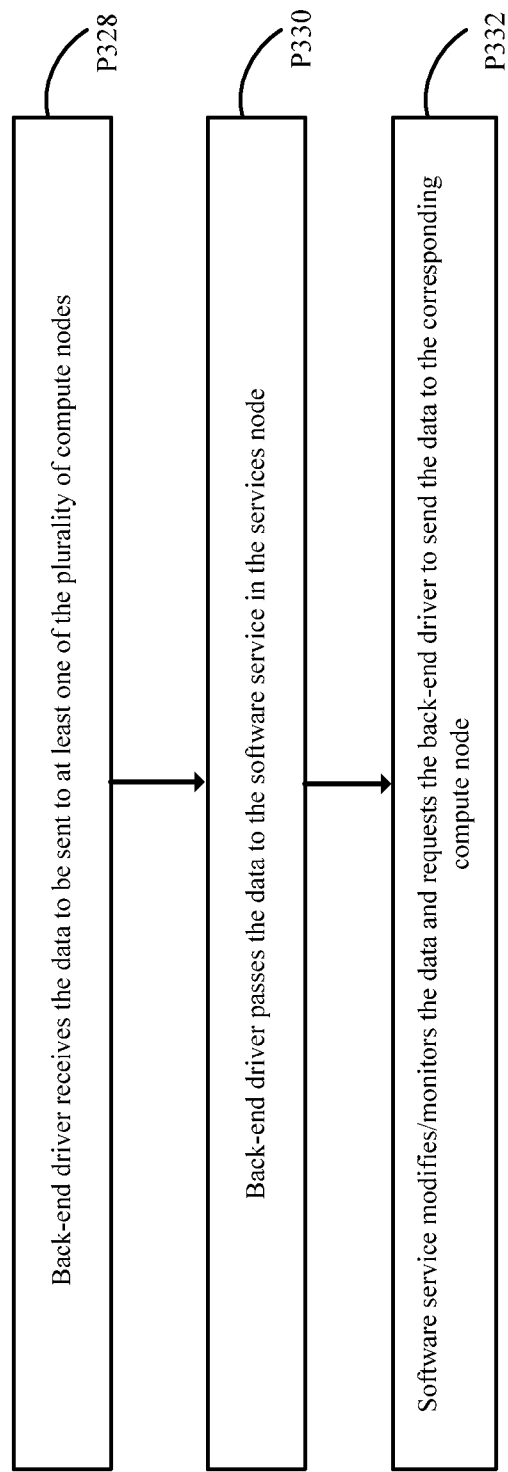

Referring to FIG. 3B, after an initialization scheme may be implemented by assigning the virtual functions 118, 120 to the services node 112 and the plurality of compute nodes 114, the back-end driver 130 receives the data to be sent to one or more of the plurality of compute nodes 114 from a virtual function or an external entity (P328). The back-end driver 130 may pass the data to the software service in the services node 112 (P330). The software service may update the data and requests the back-end driver 130 to send the data to the corresponding compute node 114 (P332).

Accordingly, a first virtual function endpoint may be exposed to a first host system and bridge the first virtual function to a second virtual function endpoint controlled by software running in a second host system. The bridge logic queues outgoing data sent to the first virtual function as incoming data to be received by the second virtual function, and queues the outgoing data sent to the second virtual function as incoming data to be received by in the first virtual function. Both virtual functions may be part of the same MR-IOV device. The software controlling the second virtual function may thus inspect or modify the data communicated by the first virtual function. Software running on a CPU may inspect or modify the data communicated by a virtual function without intercepting PCIe commands or understanding the PCIe standard. Data transmitted via a first PCIe virtual function (i.e., a first endpoint) may be moved to the queue of a second PCIe virtual function (i.e., a second endpoint) and vice versa to allow software running on a CPU to inspect or modify the data.

Advantageously, in accordance with one embodiment, MR-IOV PCIe virtual functions are assigned to the plurality of compute nodes and the adapter is configured to route or duplicate the virtual function traffic to a second PCIe virtual function assigned to the dedicated services node. The services node optionally intercepts the data sent by the virtual function (e.g., PCIe adapter), applies the software function (e.g. Firewall, Encryption, Intrusion Detection) and transmits the data to the destination. The software services use CPU and memory resources from the dedicated services node, leaving more resources available for the plurality of compute nodes to run workloads or improve performance providing high throughput and low latency.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
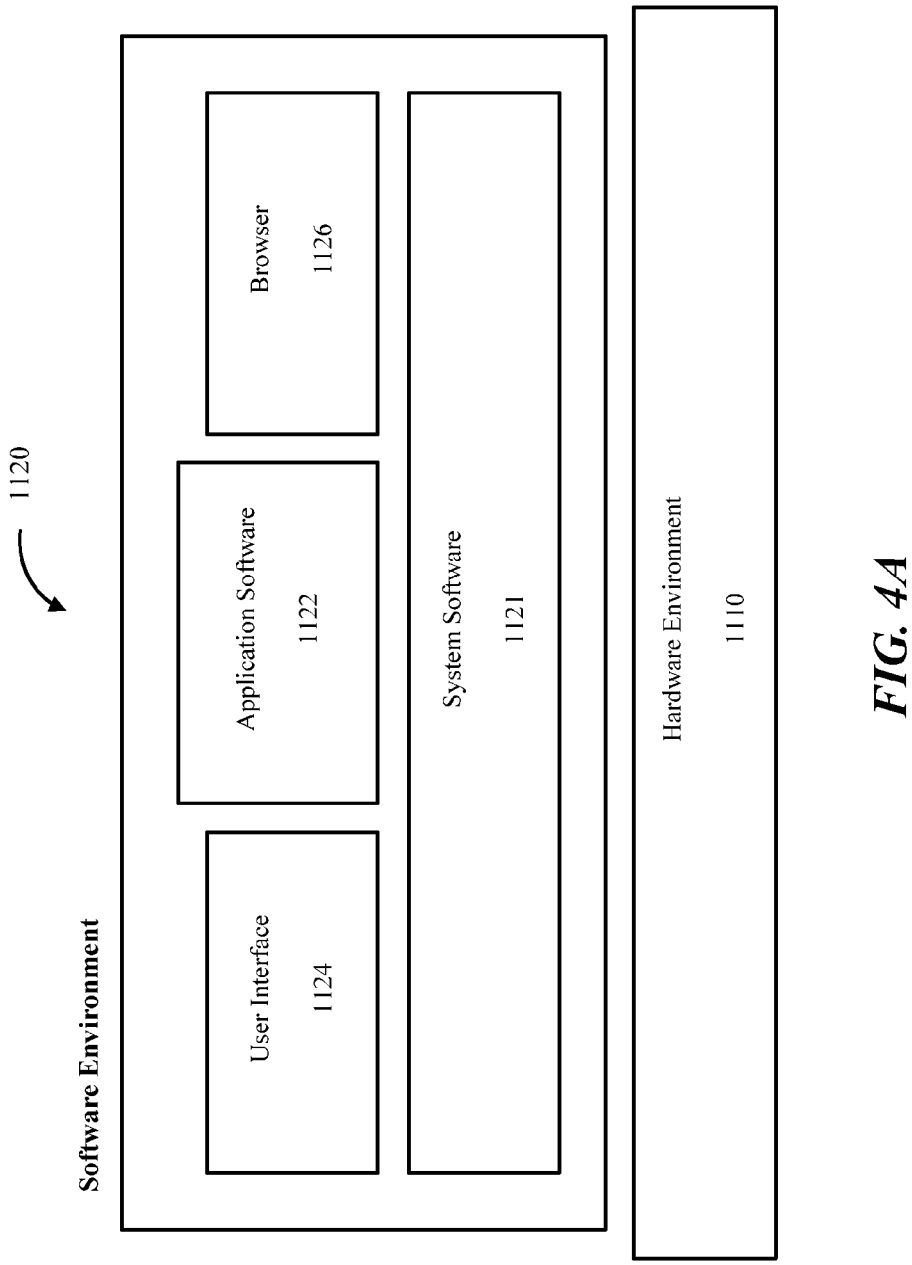
FIGS. 4A and 4B are block diagrams of hardware and software environments in which the disclosed systems and methods may operate, in accordance with one or more embodiments.
Figure 4B:
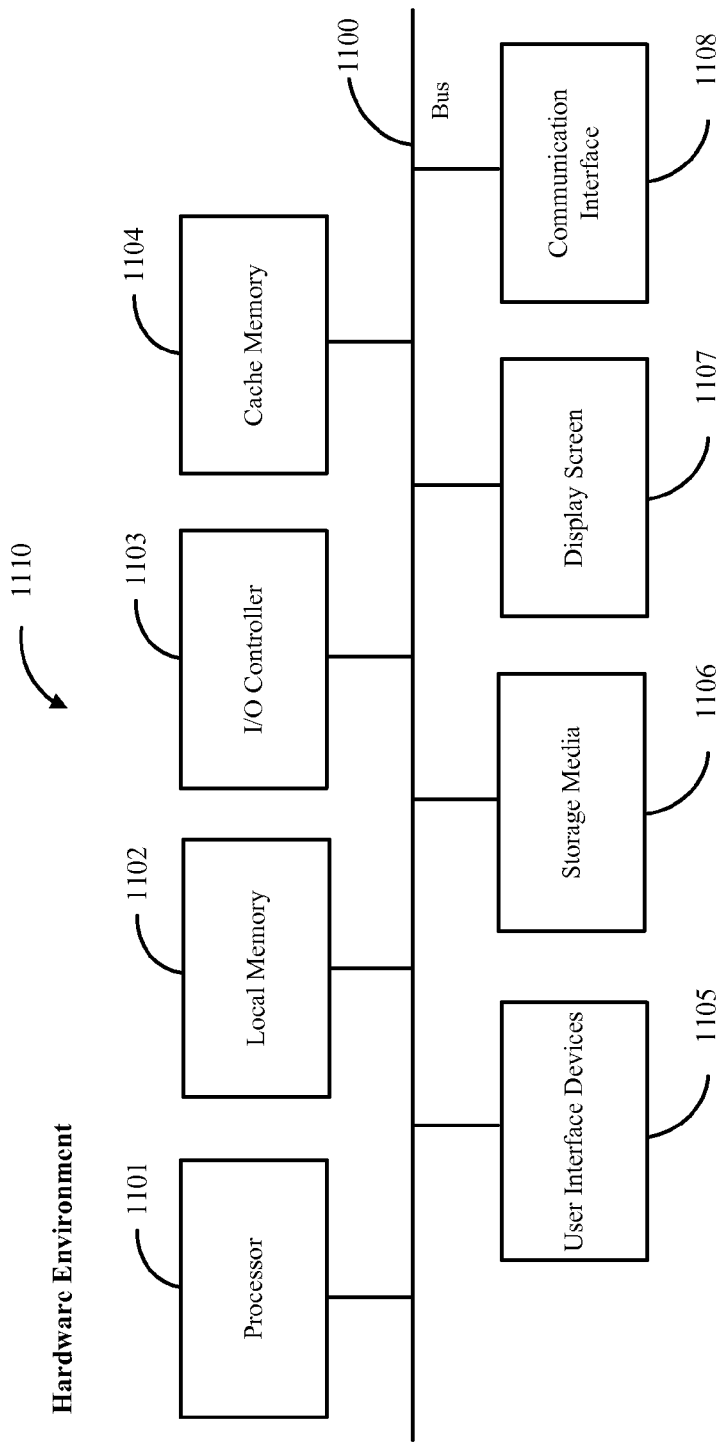

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that may contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, may be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that may direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowcharts and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for input/output (I/O) communication, the method comprising:
   assigning at least one virtual function to a services node by a peripheral component interconnect express (PCIe) and a multi-root I/O virtualization (MR-IOV) adapter during initialization;
   assigning at least one virtual function to a plurality of compute nodes enabled with software services, by the PCIe interconnect and the MR-IOV adapter;
   enabling an operating system (OS) running in a virtual machine hosted by a hypervisor on at least one of the plurality of compute nodes to at least one of access the virtual function with PCI pass-through or let the hypervisor control the virtual function directly by not passing the virtual function to the OS running in the virtual machine;
   loading a front-end driver corresponding to the virtual function by at least one of the OS running in the virtual machine, an OS running directly in the hardware or a hypervisor running on at least one of the plurality of compute nodes;
   loading a back-end driver corresponding to the virtual function by the software services running on the services node; and
   bridging the virtual function assigned to at least one of the plurality of compute nodes with the virtual function assigned to the services node by the MR-IOV adapter.

2. The method of claim 1 further comprising:
sending a request received by the virtual function assigned to a compute node to the virtual function assigned to the services node for sending data by the front-end driver in the compute node.

3. The method of claim 2 further comprising:
transferring the data to the virtual function assigned to the services node by the MR-IOV adapter.

4. The method of claim 3 further comprising:
receiving the data by the back-end driver running on the services node; and
passing the data to a software service by the back-end driver.

5. The method of claim 4 further comprising:
updating the data by the software service; and
requesting the back-end driver to send the data to the destination by the software service.

6. The method of claim 5 further comprising:
receiving the data to be sent to assigned to a compute node to the virtual function assigned to the services node for sending data by passing the data to the software service in the services node by the back-end driver;
updating the data by the software service;
requesting the back-end driver to send the data to the corresponding compute node by the software service; and
sending the data to the virtual function assigned to the services node by the back-end driver, to be received by the virtual function assigned to the compute nodes.

7. The method of claim 5, wherein the data sent by a compute node virtual function is redirected to a services node virtual function, without any changes in the protocol data encapsulated by the PCIe interconnect.

8. The method of claim 5, wherein the data remains within the MR-IOV adapter, the compute node memory and the services node memory.

9. The method of claim 5, wherein the services node uses a management driver to configure the MR-IOV adapter capabilities and to create the virtual function.

10. The method of claim 5, wherein a peripheral component interconnect (PCI) pass-through mechanism is used where the virtual function is assigned directly to a given virtual machine to remove the OS from the I/O path, while the software services running on the services node is still able to intercept the I/O traffic.

11. A computer program product comprising:
a computer readable storage medium having a computer readable program, wherein the computer readable storage medium is not a transitory signal, and wherein the computer readable program, when executed on a computer, causes the computer to:
assign at least one virtual function to a services node by a Peripheral Component Interconnect Express (PCIe) interconnect and a multi-root I/O virtualization (MR-IOV) adapter during initialization;
assign at least one virtual function (VF) to a plurality of compute nodes enabled with software services, by the PCIe interconnect and the MR-IOV adapter;
enable an operating system (OS) running in a virtual machine hosted by a hypervisor on at least one of the plurality of compute nodes to access the virtual function (PCI pass-through) or letting the hypervisor control the virtual function directly and not passing it to the OS running in the virtual machine (without PCI pass-through);
load a front-end driver corresponding to the virtual function by the OS running in the virtual machine or an OS running directly in the hardware (bare-metal OS) or hypervisor running on at least one of the plurality of compute nodes;
load a back-end driver corresponding to the virtual function by the software services running on the services node; and
bridge the virtual function assigned to at least one of the plurality of compute nodes with the virtual function assigned to the services node by the MR-IOV adapter.

12. The computer program product of claim 11, wherein the computer readable program, when executed on the computer, further causes the computer to:
send a request received by the virtual function assigned to a compute node to the virtual function assigned to the services node for sending data by the front-end driver in the compute node;
transfer the data to the virtual function assigned to the services node by the MR-IOV adapter;
receive and pass the data to a software service by the back-end driver running on the services node;
update the data by the software service; and
request the back-end driver to send the data to the destination by the software service.

13. The computer program product of claim 12, wherein the computer readable program, when executed on the computer, further causes the computer to:
transfer the data to the virtual function assigned to the services node by the MR-IOV adapter.

14. The computer program product of claim 13, wherein the computer readable program, when executed on the computer, further causes the computer to:
receive the data by the back-end driver running on the services node; and
pass the data to a software service by the back-end driver.

* * * * *